United States Patent [19]

Fraula et al.

[11] E Re. 30,478

[45] Reissued Jan. 13, 1981

[54] APPARATUS FOR RINSING AND CHEMICALLY SANITIZING FOOD WARE ITEMS

[75] Inventors: Louis F. Fraula; Stuart E. Athey, both of Troy, Ohio

[73] Assignee: Hobart Corporation, Troy, Ohio

[21] Appl. No.: 67,866

[22] Filed: Aug. 20, 1979

Related U.S. Patent Documents

Reissue of:

[64] Patent No.: 4,147,559
Issued: Apr. 3, 1979
Appl. No.: 875,868
Filed: Feb. 7, 1978

U.S. Applications:

[62] Division of Ser. No. 835,197, Sep. 21, 1977.

[51] Int. Cl.[3] ..... B08B 3/02

[52] U.S. Cl. ..... 134/57 D; 134/101

[58] Field of Search ..... 134/56 D, 57 D, 58 D, 134/95–96, 100–101, 176, 186

[56] References Cited

U.S. PATENT DOCUMENTS

| | | | |
|---|---|---|---|
| 2,129,944 | 9/1938 | Ladewig | 134/100 X |
| 2,561,631 | 7/1951 | Negri | 134/57 D |
| 2,575,493 | 11/1951 | Hilliker | 134/96 |
| 2,592,884 | 4/1952 | Fox et al. | 134/95 X |
| 2,592,885 | 4/1952 | Fox et al. | 134/101 X |
| 2,621,673 | 12/1952 | Hogens, Jr. | 134/57 D X |
| 2,687,139 | 8/1954 | Nobel et al. | 134/57 D X |
| 2,704,082 | 3/1955 | Jackson | 134/95 |
| 2,859,760 | 11/1958 | Borell | 134/57 D X |
| 2,963,029 | 12/1960 | Bock | 134/58 D |
| 3,034,519 | 5/1962 | Jacobs | 134/58 D X |
| 3,478,757 | 11/1969 | Tuthill | 134/57 D |
| 3,903,909 | 9/1975 | Noren et al. | 134/58 D |

FOREIGN PATENT DOCUMENTS

| | | |
|---|---|---|
| 223053 | 3/1959 | Australia . |
| 426994 | 10/1970 | Australia . |
| 1098492 | 2/1961 | Fed. Rep. of Germany . |
| 1072346 | 9/1954 | France . |
| 1272981 | 5/1972 | United Kingdom . |

*Primary Examiner*—Robert L. Bleutge
*Attorney, Agent, or Firm*—Biebel, French & Nauman

[57] ABSTRACT

A low wash and rinse temperature (120°–140° F.) warewasher accomplishes the same general washing and rinsing effectiveness as a conventional high temperature (150° F. minimum wash, 180° F. minimum rinse) warewasher without loss of productivity resulting from time lost between completion of washing and commencement of rinsing a given load of ware, through use of independent, dedicated wash and rinse systems, the latter of which includes a holding tank which enables independent batching of a predetermined volume of rinse solution from properly-proportioned fresh water and sanitizing agent while washing a given load of ware. The sanitizing agent is introduced independently into the holding tank and independently of the fresh water line, and is therefore unaffected by a great range of water line pressures and the mineral conditions of the water.

13 Claims, 9 Drawing Figures

APPARATUS FOR RINSING AND CHEMICALLY SANITIZING FOOD WARE ITEMS

Matter enclosed in heavy brackets [ ] appears in the original patent but forms no part of this reissue specification; matter printed in italics indicates the additions made by reissue.

This is a division of application Ser. No. 835,197, filed Sept. 21, 1977.

BACKGROUND OF THE INVENTION

This invention relates to equipment for economically and effectively cleaning and chemically sanitizing food-handling articles at a high rate of productivity. An example of such equipment is a dishwasher for use in commercial applications like restaurants, cafeterias, hospitals and other institutions where dishes are frequently reused during a meal period, although the sanitizing principle is applicable to any kind of ware with which food comes into contact.

It is necessary in the use of such equipment to destroy bacteria during a rinsing operation to meet minimum sanitation standards. That is generally done by providing high temperature rinse water, e.g., 180°-195° F., or, where such temperatures are not achievable, by adding a chemical sanitizing agent to low temperature water (approximately 120°-140° F.) to produce the bacteria-killing effect. Use of the terms "high" and "low" herein relate approximately to the above temperature ranges. The present invention is concerned with the latter approach of cleaning and sanitizing food-handling articles with low temperature water and a chemical additive, such as is illustrated in U.S. Pat. Nos. 2,592,884, 2,592,885, 2,592,886, 3,044,092, 3,146,718, and 3,370,597, all of which are assigned to the assignee of the present invention.

Although several different types of chemical sanitizing agents are available on the market, the one most commonly used today is liquid sodium hypochlorite (NaOCl), because of its high degree of effectiveness, relatively low cost, and general availability. This particular chemical, however, is not without its disadvantages, the most common being its chemical reaction with hard water minerals like iron, calcium, and magnesium, the latter two causing liming or mineral deposits onto the machine parts with which they come in contact. These deposits also tend to build upon orifices when a water powered venturi is used to draw the agent from a supply thereof into the water line en route to the rinse nozzles of the washing machine. The deposits continue to change the proportion of NaOCl to a given volume of water as they build up on the venturi. Eventually the volume of NaOCl becomes insufficient for santizing. Deposits also tend to clog the rinse nozzles themselves, often requiring frequent removal and cleaning to maintain their efficiency. For these reasons, devices such as disclosed in the aforementioned patents have limited reliability and have found limited application, both where the agent is injected into a rinse line or directly into a wash chamber. High temperature sanitizing equipment has achieved much greater use, even though the higher temperature requires considerable energy usage as well as higher initial cost for electric or gas-fired booster heater units.

In recent years, due to increasing prices and decreasing availability of energy, increased emphasis has been placed on chemical sanitizing warewashers to reduce energy consumption, and manufacturers are again introducing specialized equipment of this type to meet this need. However, to minimize the pressure variation and liming problems inherent in water introduction of sodium hypochlorite, and to maintain the efficiency and proper operation of their systems, users of systems which introduce the chemical sanitizing agent directly into a fresh water line have had to accept the need for frequency service calls from their chemical suppliers.

Possibly because of the flow pressure, mineral deposit, and frequent service problems associated with introducing a chemical sanitizing agent directly into a fresh water line of a dedicated rinse system, several U.S. manufacturers have also introduced chemical low temperature sanitizing dishwashers which operate essentially on the recirculating rinse principles described in U.S. Pat. No. 3,903,909. (However, not all of them interconnect the fresh water line and recirculating system as does the design of the '909 patent). The '909 device still uses a water driven venturi, but since the rinse fluids are mixed in the sump and recirculated, it is not necessary to maintain precise metering of the sanitizing solution into the water line, so long as the proper total amount is eventually injected.

Typically, such machines provide a wash chamber having a sump for containing wash water and a pump which draws water from the sump and recirculates it under pressure through nozzles in one or more rotating wash arms to spray the dishes. The wash water is drained from the sump after washing a load of dishes and is replaced by fresh rinse water. The rinse water, into which the sanitizing chemical is injected, is then sprayed and recirculated onto the dishes through the same pump and wash arms to provide a single, recirculated rinse. The rack containing the washed and rinsed dishes is then removed from the machine and replaced by a rack of dirty dishes. The rinse water is retained in the sump after rinsing, detergent is added thereto, and it is then used as the wash water for the next rack of dirty dishes. Ordinarily, these dirty dishes will have been scraped only, and thus contain gravies, residue of mashed potatoes, bread crumbs, small bits of food, etc.

Because the wash water must be drained after each wash in this type of machine, the sump, pump, and spray nozzles of the combined wash and rinse system are designed to operate with a minimum quantity of water, for example, as little as two gallons for each rack. This places an operational restriction on the pump, limiting its ability to deliver large volumes of water to the dishes in a short period of time, and forcing restrictions on the size of the openings in the wash and rinse nozzles, thus increasing their chances of clogging with food particles, Additionally, since large food particles frequently accidentally remain on the tops and bottoms of dishes when placed in the wash chamber, a strainer system is required to capture these larger particles and prevent their passing through the pump and clogging the nozzles. The strainers are generally provided with very closely spaced holes of ⅛ inch diameter or less, and are said to be 1/32 inch in the aforementioned '909 patent. What happens when using systems of this type, therefore, is that the smaller food particles and other tiny suspended granular objects pass through the strainer, and the pump continually redeposits them on the ware and on the inside surfaces of the wash chamber, the pump, the wash arms, and so on. Compromise is therefore necessary in designing the size of the strainer holes in order to satisfy conflicting conditions. On the one hand, the holes should be as small as possible to prevent passage of soil particles; on the other, they must be large enough to prevent strainer clogging and pump starvation with accompanying loss of water circulation. For this reason, redeposition of small soil particles in such machines is an unavoidable condition during washing.

The aforementioned '909 patent proposes to rinse out the spray arms and drain some of the rinse water before closing the drain by connecting the wash arms to both the fresh water line and the recirculating pump (with a check valve therebetween). Before the drain closes, approximately 20% of the water consumed in each cycle is immediately drained in an attempt to flush debris from the wash system and chamber. This water is lost, passing down the drain with the soiled wash water. Effective cleaning with such a system is still believed difficult, however, because of other operational compromises inherent in such a machine. For example, the commercial machines of a U.S. manufacturer believed to be the owner of the aforementioned '909 patent also have the drain maintained open while introducing approximately two quarts of fresh water for flushing purposes, but the water is introduced directly into the sump rather than into the wash arms. The structural design appears such that the pump probably cannot pick up much, if any at all, of this small quantity of water while the drain is open, and therefore cannot recirculate it for flushing the arms or the wash chamber. Some soil will therefore inevitably remain in the system.

On general principles as well, such retained soil is all but impossible to remove in the single rinsing action with the limited water volume which is commonly provided in commercial dishwashers of this particular design. The strainers conventionally found in these machines are designed in the form of baskets or trays which capture the larger food particles, to enable their easy lifting from the machine and dumping into a disposer or garbage pail. In order for the strainer to be effective, the recirculating water must pass continually through the strainer on the way to the pump intake, and therefore through the garbage in the strainer as well. The manufacturers therefore recommend frequent cleaning of these trays, to reduce the amount of soil which the recirculating rinse water must necessarily pass through. However, machine operators cannot be relied on to perform such tasks, particularly where more than one individual may use or be responsible for the machine during the same meal period. The end result in such machines is that, while the bacteria on the dishes may be properly killed, there is nevertheless a continual redeposition of fine soil even during rinsing. These effects—fine soil remaining in the recirculating system for the rinse, and soil remaining in the strainer—sometimes result in an unappetizing appearance or feel of the dishes, giving the user of the dishes the impression that they are unsanitary, even though the bacteria may have been destroyed.

As suggested above, the design direction in recent years for equipment for cleaning and chemically sanitizing dishes (as exemplified by the aforementioned U.S. Pat. No. 3,903,909), has also created a substantial reduction in productivity as compared to standard dishwashing machines utilizing high temperature water for sanitizing the dishes. In standard, high temperature dishwashers, the rinse water is normally introduced through a "dedicated" rinse system, i.e., one which is separate from the wash system and carries only fresh, very hot rinse water. Generally, the wash water in the wash system is saved in the wash system sump and reused for washing successive racks of dishes. Used rinse water from the independent rinse water system is conducted to the wash system, causing overflow of some of the used wash water through a standpipe connected to the drain, and continually replenishing the wash water supply with hot clean water. The rinse may use about two gallons (of which some will overflow through the standpipe before mixing with the wash water, so that only a part of the rinse water will dilute the wash water). Detergent is then added (usually automatically) to the wash water periodically because of this partial dilution.

Since the wash water is maintained in the sump rather than being drained each cycle, the volume thereof may be relatively large. This provides considerable flexibility in the design of the water pump and the size of the nozzle orifices in the wash arms, simply because the large volume of water in the sump permits usage of a high capacity pump for delivering water in large volumes through the spray system to the dishes.

Minimum total spray volumes are specified by the organizations that create industry standards. For example, Standard No. 3, Section 6.05 of the National Sanitation Foundation of the U.S. (N.S.F.), pertaining to Single Tank, Stationary-Rack, Door-Type Chemical Sanitizing Machines, requires not less than 80 gallons of water to be delivered for each 20 inch × 20 inch rack for the combined washing and rinsing of a rack of dishes. The minimum pump delivery capacity is required to be at least 40 gallons per minute (g.p.m.). This is easy to achieve if the sump is large and plenty of water is available. However, if the sump is small and a minimum-capacity pump is used to deliver 80 gallons of water, the pump time during the cycle will be a full two minutes. This sets a theoretical production maximum of 30 racks of dishes per hour for a minimum capacity pump, but is achievable only if absolutely no time is required for water fill, drain, loading and unloading the racks, an impossibility even in an automated machine. Even if a high capacity pump is used, wash volumes and delivery rates will still be restricted far more in a machine of the '909 type than in one with a dedicated rinse system.

More particularly, these restrictions and this reduction in productivity are a result of several things. First, since the same sump and same spraying system are used for both washing and rinsing, it becomes essential to drain the sump for each machine cycle, i.e., for each rack of dishes washed, and this results in a loss of productive time. The machine must stop in the middle of each cycle and drain the sump almost completely, and sometimes flush as well, before the actual dish rinsing can commence. This waiting period is a minimum of 10 seconds, and may be as much as 30 seconds, before the rinse spray becomes effective, depending on how rapidly the sump fills. This seemingly small time actually constitutes a minimum of 8%, and as much as 25%, of a total two minute cycle time. When multiplied over a large volume of dishes, this could be a very serious cost disadvantage in labor alone.

Secondly, because of the cost of heating water even to the "low" temperature of 140° F., the machines are constructed (as indicated above) to use as small a quantity of water as possible, approximately two gallons, plus a few extra quarts where a "flush" period is used. The amount of water thus consumed each cycle is only slightly greater than that used for rinsing in high temperature machines which sanitize by means of heat. However, since this rinse water (which is dumped during the next cycle) is the only water available in the sump for recirculation, the sump and pump capacities must be kept small. Obviously, the higher the pump capacity, the greater the supply of water that is required to feed the pump is order to prevent cavitation and attendant loss of pressure, which result in reduced effectiveness of the water spray contacting the dishes. Compensation is therefore made for the smaller quantity of water in the sump by reducing the pump capacity and restricting the orifice size of the nozzles of the spraying system. This in turn reduces the flow of water through the nozzles and reduces the volume of water which, in a given time period, contacts the dishes which are being washed. It also increases the chances that a nozzle will clog with particles of food and other materials. The reduced flow is then compensated for by extending the washing time, but this further reduces productivity.

The low temperature chemical sanitizing dishwashers such as illustrated in U.S. Pat. No. 3,903,909 and its commercial counterparts ordinarily lack a tank heater. They rely solely on the rinse water temperature to maintain adequate wash water temperature. The N.S.F. minimum temperature for washing is 120° F. This requires the inlet fresh rinse water temperature to be about 140° F., because the water cools as it is circulated by the pump and contacts the dishes and the walls of the dishwasher. Under some circumstances, such as in nursing homes, the water heater temperature may be around 120° F. to begin with, requiring a separate booster heater for the fresh water line connected to the dishwasher. If after the rinse is completed, the next washing cycle is not started within a short time, the wash water will cool below the 120° F. washing temperature. Under these operating conditions the machine must be cycled to bring in hot wash water to meet code requirements and to control foam and pump cavitation.

Thus, when considering the total costs of detergent, sanitizing chemical, rinse agent, heat energy for the water, machine depreciation and maintenance, and increased manual labor for each rack of dishes (due to reduced machine capacity), it is likely that the total cost to the user is greater when using a single rack machine such as illustrated in the '909 patent, than when using a comparable machine in which high-temperature sanitizing is employed. Labor alone is one of the major cost factors in washing dishes, and this is considerably reduced with the present apparatus and method as compared to that of '909 patent.

In addition to the standard high temperature dishwashers previously described, there are known to exist in other countries, particularly where hot water heaters are not readily available or are available only at low temperatures (perhaps 120° F.), prior art dishwashers in which a low temperature fresh water supply line introduces water into a holding tank mounted on the dishwasher. The holding tank includes an air gap for physically separating the fresh water line and the water system of the dishwasher. The level of the water in the holding tank is controlled by a float which opens a valve in the fresh water supply line upon descent of the float, and closes the valve when the float reaches its upper level. Between the holding tank and rinse nozzles, which are dedicated solely to the rinse system, there is an auxiliary booster heater tank having heating coils for raising the low temperature water to the high temperature necessary to destory bacteria when rinsing. When rinsing is to take place, the recirculating pump for the wash water stops and an auxiliary pump in a water line between the holding tank and the auxiliary booster heater tank is operated to pump rinse water through the rinse nozzles. Fresh water is introduced into the holding tank as soon as the float begins to descend, functioning merely to maintain a supply of rinse water available for the rinse system. Control of the quantity of water utilized for rinsing is a function of the time the rinse pump operates.

Thus recently introduced machines for achieving chemical sanitization of dishes, while solving one problem, namely a reduction in consumption of energy by eliminating the need to heat water to 180° F. or more, have thus introduced new problems in productivity, cost of operation, and poorer washing results, as compared with existing high temperature machines. The present invention proposes to solve the washability, productivity, and cost problems inherent in these prior art designs.

SUMMARY OF THE INVENTION

Briefly, the present invention solves the washability, productivity, and cost problems of prior art chemical sanitizing designs through the use of separate, dedicated wash and rinse systems. That is, the present invention combines the advantages of standard dishwashing machines which use high temperature water for sanitizing the dishes with the economies possible with lower temperature chemical sanitization. Thus the present invention saves the wash water for reuse in the wash system sump, and the rinse carries only fresh, chemically sanitizing rinse water which is sprayed directly onto the dishes and then collected in the sump for replenishing and refreshing the wash water. In contrast, therefore, with those prior art chemical sanitizing machines which dump the wash water after each cycle, and thus limit the wash water in the sump to approximately 2–2½ gallons, the preferred embodiment of the present invention retains 16 gallons of wash water in the sump and recirculates this water during the wash cycle at a rate of 160 gallons per minute. This reduces the required wash time to as little as ½ that of prior art machines, while also improving the washability. A single rack machine according to the present invention, for example, has a capacity of 53 racks per hour, whereas a typical, comparable, prior art machine is limited to 28 racks per hour.

These advantages are possible because the present invention provides a fresh water chemical sanitizing rinse which is consistently and reliably properly proportioned, properly mixed, properly pressured, and properly distributed. As indicated in the prior art discussion above, such a rinse has heretofore been unavailable. That is, considerable prior art effort has gone into direct sanitizer injection into the fresh water line as it is supplied directly to rinse arms. However, and as indicated, maintaining and assuring the proper ratio of sanitizing agent to wash water is extremely difficult, due to variations and fluctuations in line pressure, resultant changes in flow rates, and interference with proper operation of the system caused by hard water deposits. The alternative and more recent approach provides a more consistent ratio by using the sump for mixing the sanitizer with the rinse water, and recirculating the rinse water onto the dishes. This may be done either by injecting the sanitizer into the rinse water as it is carried into the system, or adding the sanitizer to the wash tank separately, where it is entrained, mixed, and recirculated. Either way the system is less sensitive to the rate at which the sanitizer is injected, as long as the net quantity is correct.

In the present invention, however, the sanitizing agent is neither injected into a directly fed rinse line nor mixed in the wash chamber sump. Instead, a separate holding tank is provided which accumulates a predetermined quantity of the chemically sanitizing rinse solution prior to spraying through the rinse nozzles. The fresh water supply line is connected to supply water to the holding tank, as needed, and preferably is open only during the wash cycle for the dishes, so that fresh, hot rinse solution is prepared only as needed. A float within the holding tank assures that the proper amount of fresh, hot water (approximately 120°-140° F.) will be accumulated regardless of the available supply pressure or fluctuations therein. (It should be noted, however, that N.S.F. standards call for available supply pressures of 15-25 psi). At the same time, a precisely controlled quantity of sanitizing agent, such as a 5.2% solution of sodium hypochlorite, is separately added to the holding tank. In the preferred embodiment, the holding tank has a capacity of 1.8 gallons, and 10 cc of the 5.2% NaOCl solution is added to provide a rinse solution having approximately 75 ppm of NaOCl. (N.S.F. standards call for a minimum of 50 ppm). As the water enters the holding tank it circulates for thorough mixing of the water and sanitizer, thus assuring that the entire quantity of rinse solution will be properly proportioned and properly mixed. Normal fluctuations in line pressure are automatically accommodated and do not alter the quality or quantity of the rinse solution.

Following the wash cycle and a dwell period, the rinse solution is sprayed onto the dishes by a rinse pump which forces the rinse solution at a reliable and consistent pressure (20 psi in the preferred embodiment) from the holding tank to a pair of dedicated, rotating rinse arms which spray the solution onto the dishes, sanitize, and removes redeposited soil. Because a pump is used, thus assuring a reliable rinse pressure, it is possible with the present invention to use rotating rinse arms both above and below the dishes for better distribution of the sanitizing rinse solution. Many prior art machines which use line pressure for the rinse spray (whether chemically or thermally sanitizing) do not use rotating upper arms since they cannot be sure that the spray pressure will be sufficient to assure proper rotation of such arms. With the present invention, the dedicated mixing and holding tank, rinse pump, and rotating spray arms assure that the rinse spray will be properly proportioned, properly mixed, properly pressured, and properly distributed.

It should also be noted that the present invention is much more tolerant of liming or hard water deposits. In the preferred embodiment, the sanitizer is supplied to the holding tank independently of the fresh water supply so that hard water deposits will not impair the sanitizing agent supply system, or injector. In the preferred embodiment, the sanitizer is injected by means of an air transport injector such as described in U.S. application Ser. No. 788,039, filed Apr. 15, 1977. Preferably, and as shown in the preferred embodiment herein, the sanitizer is introduced into the rinse solution holding tank at the same place the stream of fresh water is added to the tank, above the surface of the water therein. This helps capture or entrain the sanitizer in the water and minimizes the escape of sanitizer vapor into the surrounding atmosphere, while assuring that the proper quantity of sanitizer will be consistently added to the tank without the formation of hard water deposits on the sanitizer injection system.

Similarly, the formation of deposits on the rinse spray arms will not alter the strength of the rinse solution, since the rinse solution is already premixed in the holding tank. Such deposits, at most, will merely change the flow rate as the solution is pumped by the rinse pump. However, since the holding tank is filled with exactly the proper quantity of rinse solution at the proper strength, it follows that the proper concentration will be sprayed onto the dishes.

Thus, the preferred embodiment incorporates a holding tank, a rinse pump, dedicated rinse nozzles, sources of fresh rinse water and chemical sanitizing agent, and suitable control means which are actuated by the washing machine at predetermined times in its cycle for simultaneously introducing the fresh rinse water and the sanitizing agent into the holding tank, and for separately terminating the introduction thereof after the proper quantities of each have been introduced therein. In the preferred embodiment, the sanitizing solution is prepared in discrete, properly proportioned batches, each of which is then pumped from the holding tank through the dedicated rinse nozzles, followed at the appropriate time by the preparation of another batch.

It is therefore an object of the present invention to provide a method and an apparatus for rinsing and chemically sanitizing food ware items in a warewashing machine; a method and apparatus which have substantially higher productivity and substantially lower service needs than prior art machines; which provide the substantially improved productivity by means of a separate, dedicated rinse system having a holding tank, a rinse pump for pumping the solution from the tank to dedicated rinse nozzles, and means for supplying precise quantities of rinse water and sanitizing agent to the holding tank substantially independently of supply line pressures; which thereby permit the wash water to be saved and recirculated for washing successive racks of dishes; which are substantially unaffected by the formation of hard water deposits; and which assure a properly proportioned, properly mixed, properly pressured and properly distributed sanitizing rinse spray in an economical, highly reliable configuration readily suited and adapted for widespread use.

Other objects and advantages of the invention will be apparent from the following description, the accompanying drawings and the appended claims.

DESCRIPTION OF THE PREFERRED EMBODIMENT

Figure 1:
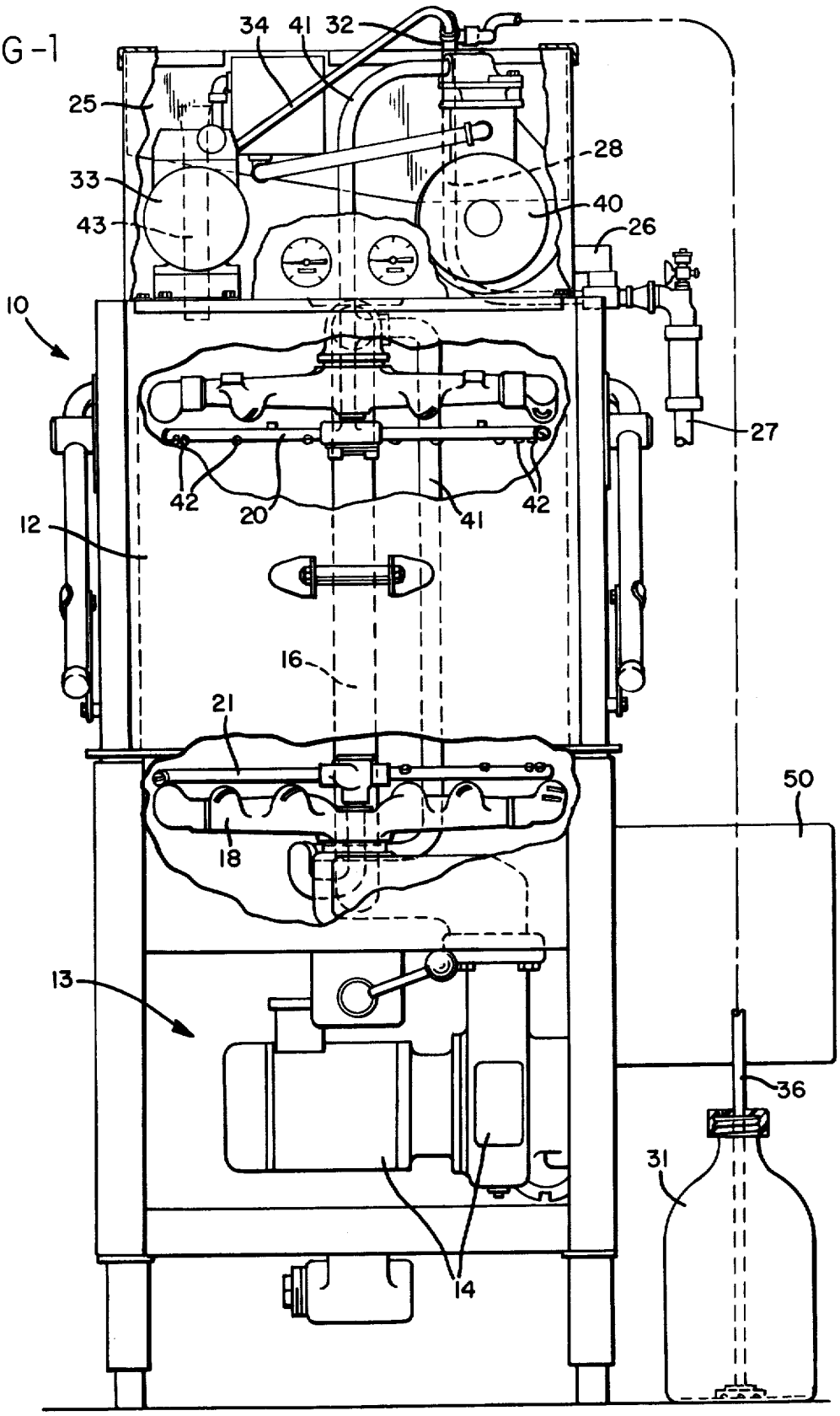
FIG. 1 is a partially broken away front view of a dishwashing machine incorporating a rinse system according to the present invention.

FIG. 1 illustrates a single tank dishwashing machine 10 for washing food ware items such as dishes, utensils and so on. Typical prior art machines of this type, but which use high temperature rinse water for sanitizing the food ware items, are illustrated in U.S. Pat. Nos. 2,286,203 and 3,911,943, assigned to the assignee of the present invention. Such machines are well-known, and the general operation will therefore be described only briefly.

Machine 10 is a batch type machine, in which a rack of soiled dishes is loaded into a single, enclosable wash chamber 12. There the rack of dishes is first washed with a high pressure spray of recirculated wash water, and then rinsed with a sanitizing rinse spray. Machine 10 thus includes a sump 13 which holds about 16 gallons of wash water. The wash water is reusable and is recirculated under pressure by a pump and motor assembly 14 through suitable conduits 16 to upper and lower rotating wash arms 17 and 18. Due to the large quantity of water available in the sump, the pump and motor assembly 14 and wash arms 17 and 18 recirculate the wash water at a rate of about 160 gallons per minute, thus providing excellent washability and rapid performance.

After the dishes have been washed for a suitable period of time (minimum times and flow standards are specified by the National Sanitation Foundation), the motor and pump assembly 14 are turned off and the dishes are rinsed and sanitized by supplying a fresh rinse solution to the upper and lower rinse arms 20 and 21. The rinse system is dedicated. That is, only fresh rinse solution passes through it, and it is not recirculated. The rinse arms are thus provided with conduits separate from those of the wash system, and in prior art machines, were connected directly to the external fresh water supply for the dishwashing machine. The rinse water which is sprayed onto the dishes then flows to the sump 13 where it refreshes the wash water therein. The sump includes an overflow drain (not shown) which automatically controls the level of water in the sump.

Figure 3:
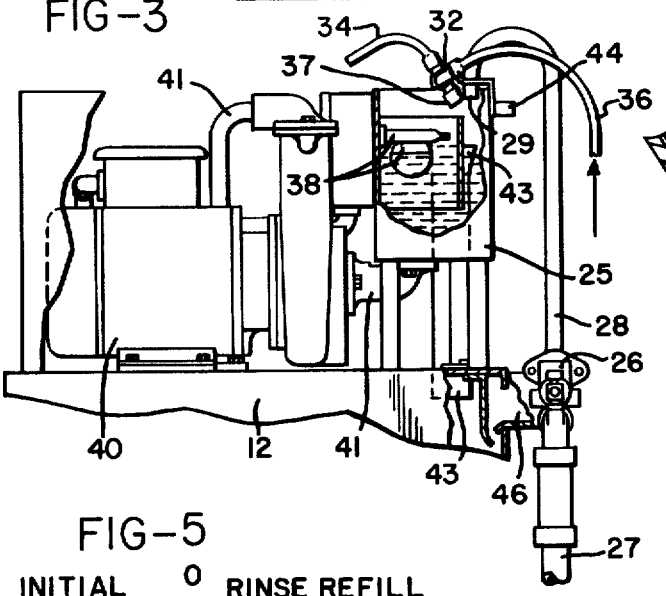
FIG. 3 is a partially broken away side view of the rinse holding tank, rinse pump, and associated assemblies at the top of the dishwashing machine.

Unlike such prior art machines, however, the present invention provides a sanitizing, low temperature fresh water rinse which is fully compatible with this type of dishwashing machine. In the present invention, a holding tank 25 is mounted on top of machine 10, and connected through a rinse control valve 26 operated by a solenoid 26a (FIG. 6B) to a fresh water line 27. Line 27 provides fresh rinse water of at least 120° F. and above, but ordinarily well below the thermal sanitizing range of 180° F. When valve 26 is open, a conduit 28 then introduces the rinse water into tank 25 through its outlet end 29 (FIG. 3).

Figure 4:
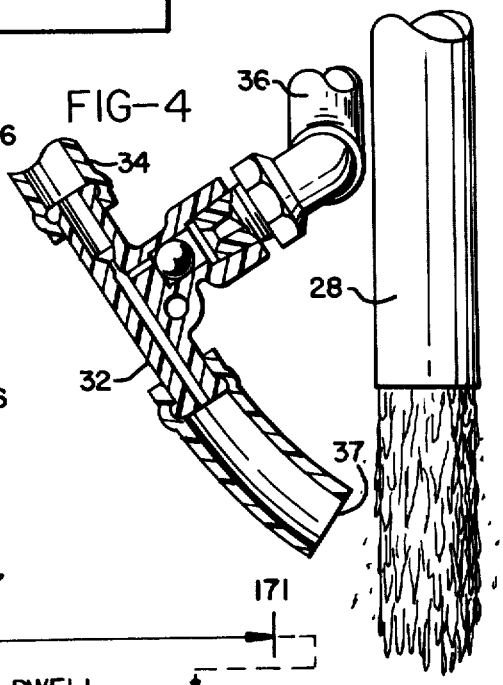
FIG. 4 is a cross-sectioned view of the chlorine injector venturi.

As the fresh water flows into tank 25, the chemical sanitizing agent is also introduced into the tank. In the preferred embodiment, the sanitizing agent is 5.2% NaOCl which is aspirated from a bottle 31 thereof into holding tank 25 by an air driven venturi aspirator 32 (FIGS. 3 and 4) similar to that shown in U.S. application Ser. No. 788,039, filed Apr. 15, 1977. This includes an air compressor 33 which is energized at a suitable time to provide compressed air through an air conduit 34 to the aspirator. This, in turn, draws the chemical sanitizing agent through a conduit 36 from the bottle 31 and injects it by means of air transport into holding tank 35. In the preferred embodiment, the venturi aspirator 32 is designed to discharge the chemical sanitizing agent substantially at atmospheric pressure, in order to minimize vapor formation. Further, the distance between the venturi outlet and the water within the holding tank 25 is very short (see FIG. 3) and the aspirator outlet 37 is positioned adjacent the outlet 29 of the fresh water line conduit 28 (FIGS. 3 and 4) so that the fresh water and sodium hypochlorite are introduced into holding tank 25 at substantially the same place, and such that the NaOCl is entrained therein to minimize the escape of NaOCl vapor into the surrounding atmosphere.

Preparation of the sanitizing rinse solution in holding tank 25 is preferably inhibited until the wash cycle is engaged, so that the rinse solution will be fresh and warm. When the wash cycle is started, air compressor 33 is operated for 17 seconds and injects approximately 10 ml of the 5.2% NaOCl into holding tank 25. The rinse water supply valve 26 is simultaneously opened and held open a somewhat longer time until tank 25 has been filled with 1.8 gallons, yielding a concentration of approximately 75 ppm of chlorine. As the fresh water is introduced into tank 25 through the conduit outlet 29, it creates sufficient turbulence within tank 25 to circulate and mix the fresh water and sanitizing agent to assure proper and uniform mixing thereof. They are thus properly mixed within the tank, and certainly by the time they exit from the rinse arms. When the 1.8 gallons have been drawn, valve 26 is closed by a float control 38 which operates independently of the air compressor 33. Details of such a float control 38 are known in the prior art, as described in U.S. Pat. Nos. 3,844,299 and 3,911,943 assigned to the assignee of the present invention.

After the wash cycle has been completed, a rinse pump 40 is energized. Pump 40 pumps substantially all of the rinse solution under pressure from tank 25 through rinse solution supply conduits 41 into the dedicated rinse arms 20 and 21. Rinse pump 40 provides a uniform, reliable pressure which is independent of the pressure available from the fresh water line 27. As a result, both the upper and lower rinse arms 20 and 21 are freely rotatable and are propelled by the pressure of the rinse solution supplied by rinse pump 40, as the solution is sprayed through the rinse nozzles 42 located on the rinse arms.

Figure 2:
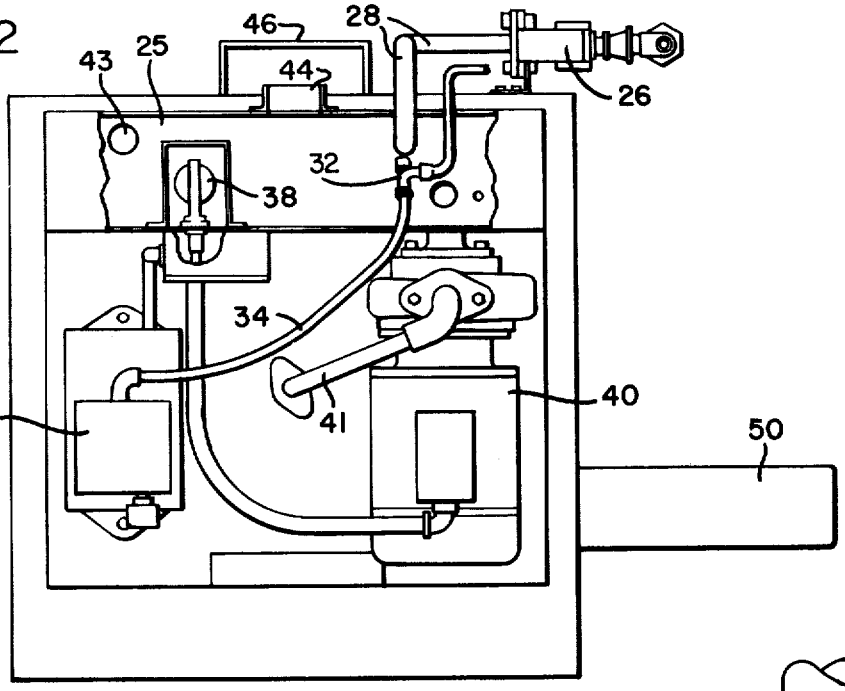
FIG. 2 is a top view of the machine.

Holding tank 25 is also connected directly to the wash chamber 12 through a standpipe or overflow drain 43. Ordinarily float 38 determines the level of solution in tank 25, but if valve 26 should fail to close for any reason, pipe 43 protects against an overflow. Tank 25 also includes a weir 44 at its rear (FIGS. 2 and 3) which provides additional overflow protection, by dropping excess water into the vent pipe 46 for chamber 12. The aspirator outlet 37 and the fresh water conduit outlet 29 are both located above the level of the weir 44 (FIG. 3) to provide an air gap for protection against inadvertent siphoning of the solution back into these lines.

Overflow pipe 43 is also used in the present invention for initially filling the dishwashing machine 10. For the initial fill cycle, the float control 38 is bypassed, and valve 26 is held open until sump 13 has been filled with a sufficient quantity of water. This provides for filling machine 10 through a single valve 26 and a single fresh water line 27. In the preferred embodiment, the sump actually receives approximately 12 of its 16 gallons through the overflow pipe 43. Rinse pump 40 is then actuated to drain the 1.8 gallons in tank 25 into the wash chamber 12. In this manner tank 25 is returned to its empty standby condition, so that when a rinse solution is required it may be prepared fresh. Otherwise, it might cool during an extended dwell period.

Figure 6A:
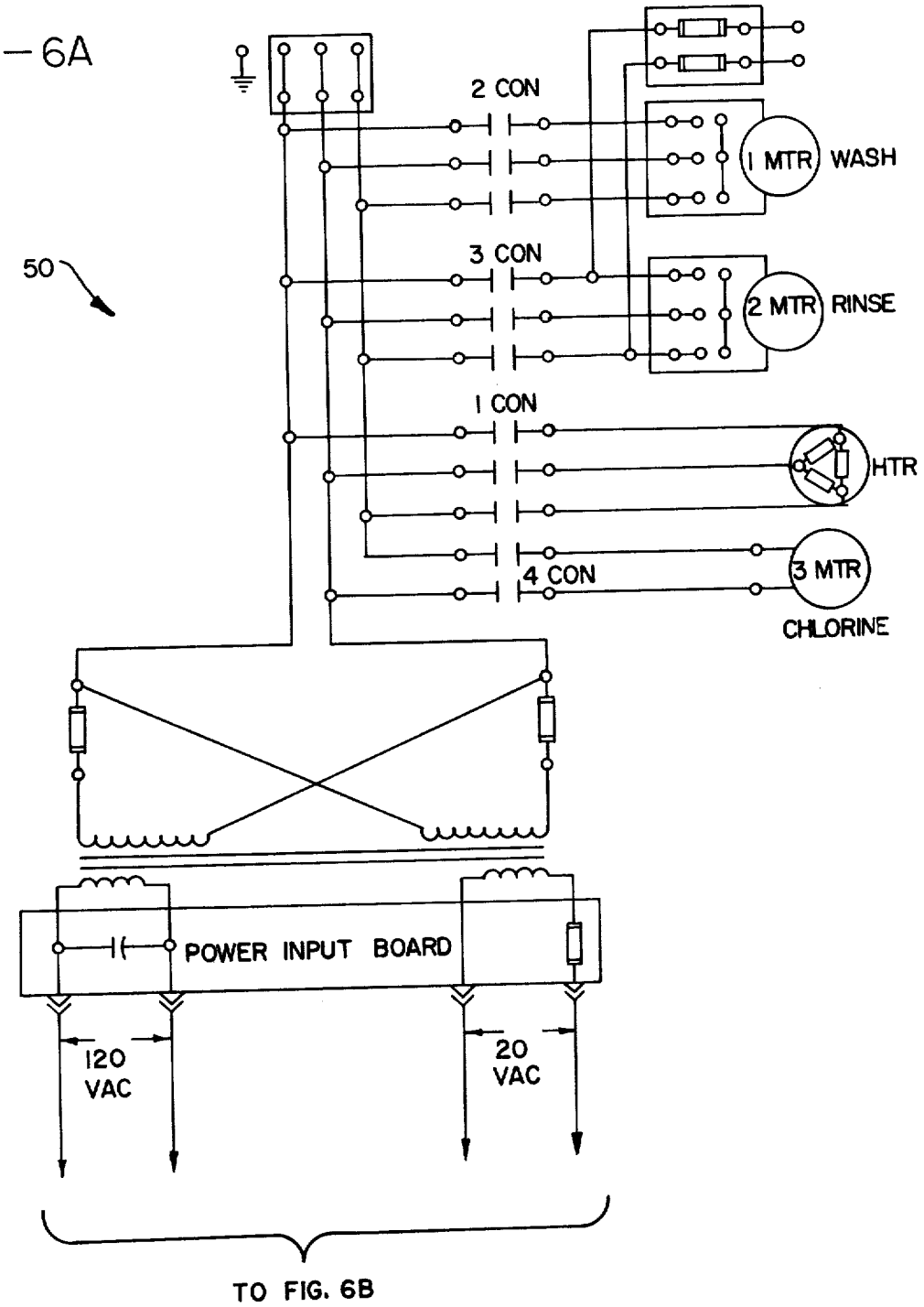
FIGS. 6A and 6B are the circuit diagrams for the dishwasher controller.
Figure 6B:
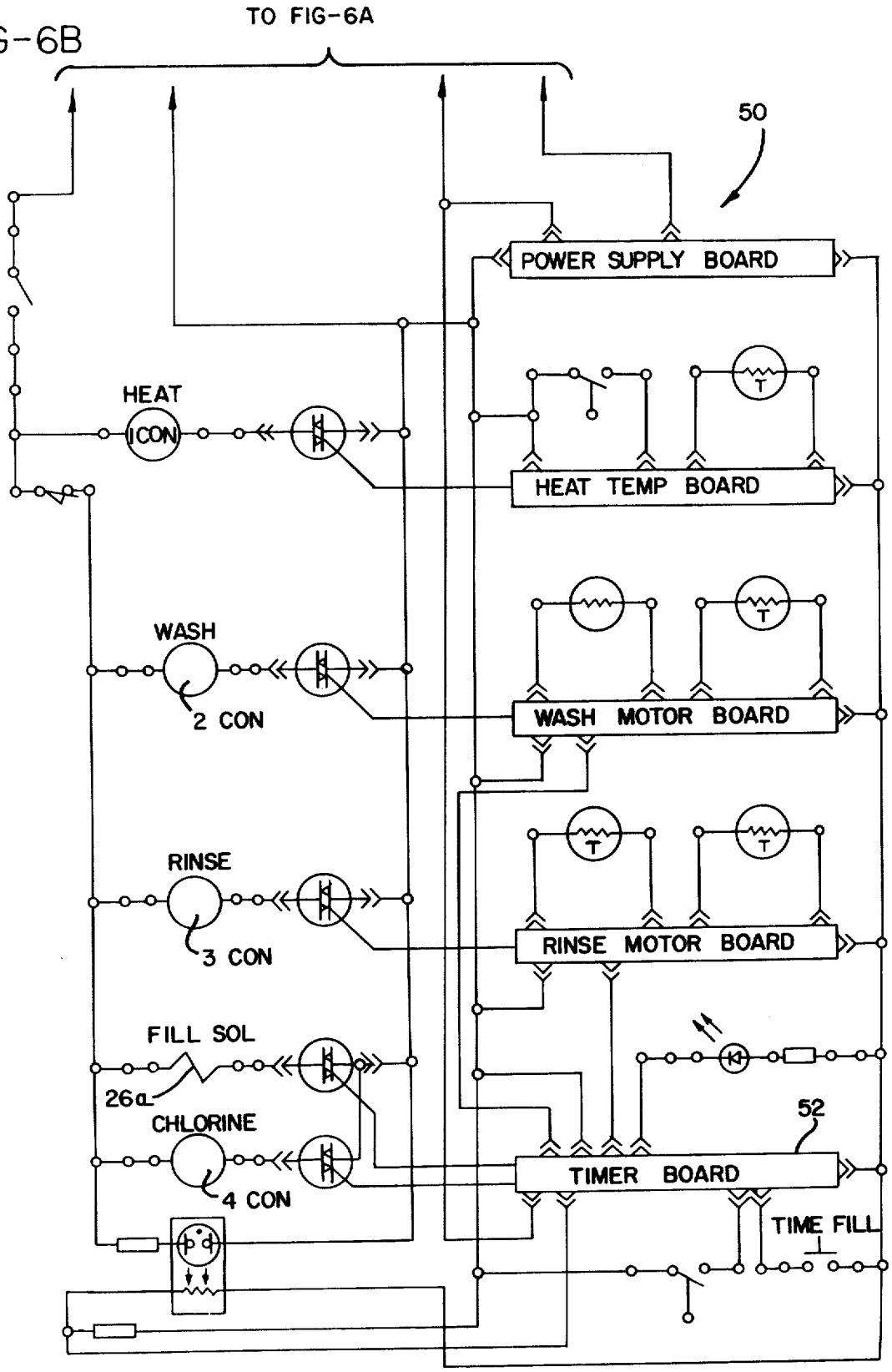
Figure 7A:
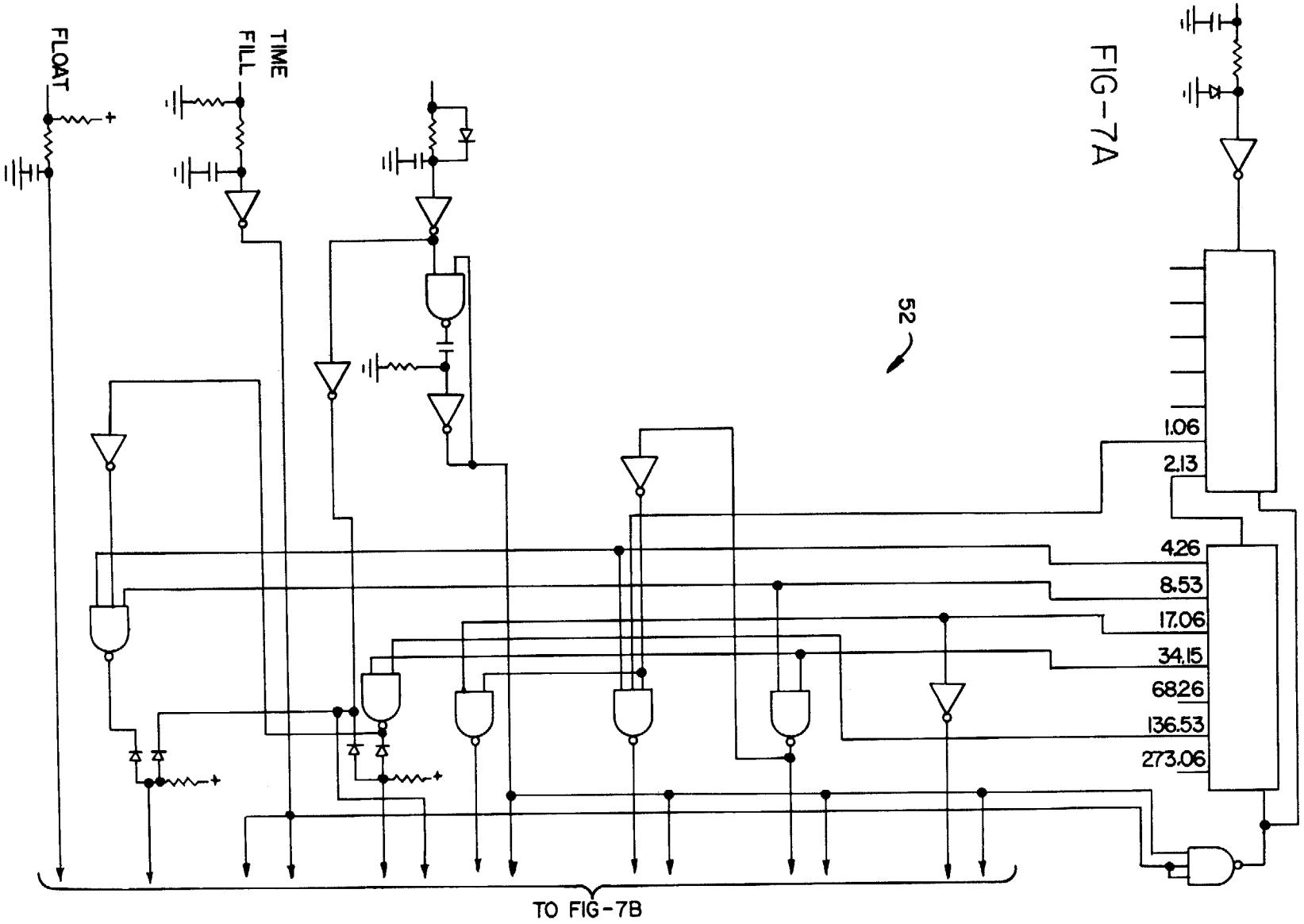
FIGS. 7A and 7B are the circuit diagrams for the timer in FIG. 6B.
Figure 7B:
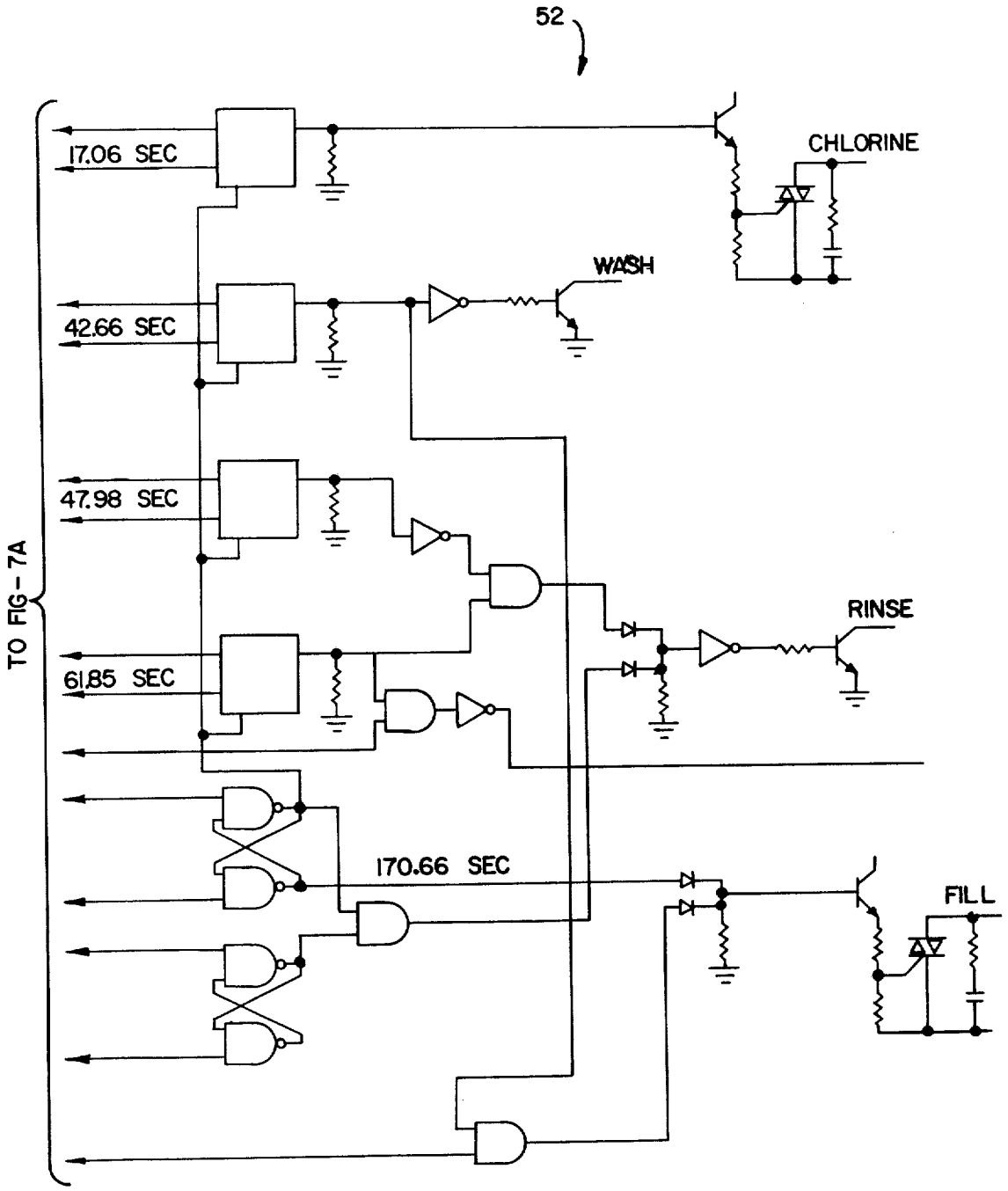

Operation of machine 10 is preferably under the control of a suitable automatic control means such as a controller 50. Such controllers are well-known in the art, and any suitable controller may be selected. The preferred embodiment is shown in FIGS. 6A, 6B, 7A, and 7B. FIGS. 6A and 6B illustrate the control circuit within controller 50, and FIGS. 7A and B are the circuit for timer 52 in FIG. 6B. The circuits are similar to those shown and described in the aforementioned U.S. Pat. Nos. 3,844,299 and 3,911,943, and the operating principles thereof are thus known to practitioners in the art. Reference is accordingly made to these patents for further details of the several control boards in controller 50.

Figure 5:
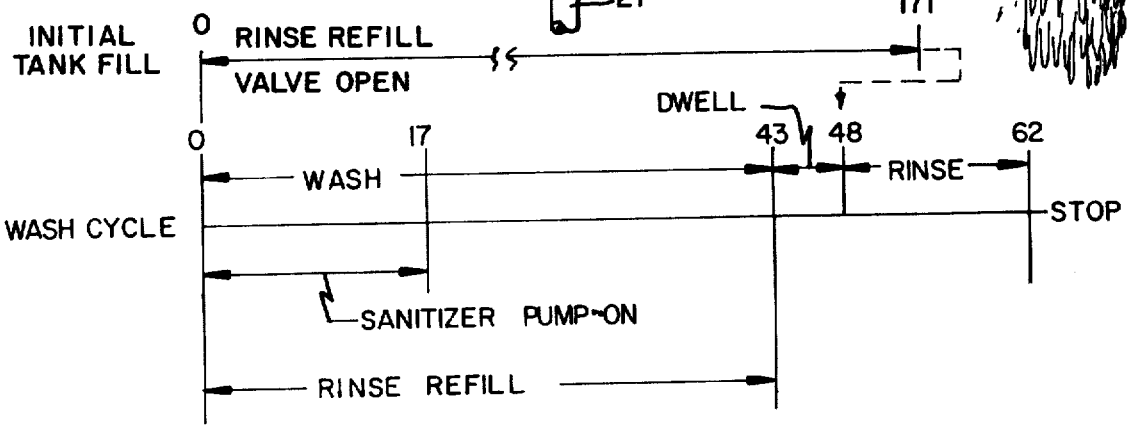
FIG. 5 is a timing chart showing both a normal wash cycle and an initial fill cycle.

FIG. 5 is a timing chart for operation of machine 10 under the control of controller 50. Thus, during a typical wash cycle the wash chamber 12 is first loaded with a rack of soiled utensils and then closed. The wash cycle is commenced (either automatically by closing the wash chamber, or manually) and the wash water is recirculated onto the dishes for 43 seconds. Pump 14 is then stopped and machine 10 has a five second dwell period. During the first 17 seconds of the wash cycle the air compressor 33 is operated to inject the sanitizing agent into the holding tank. The fresh water valve 26 is simultaneously opened as the wash cycle and air compressor start, for also introducing fresh water into holding tank 25. However, while the air compressor 33 is exclusively under the control of controller 50, valve 26 is also under the control of float 38, and during normal operation it is float 38 which closes valve 26. (If the water line pressure is extremely low, valve 26 will eventually be closed at the end of the wash cycle). Thus the controller 50 initiates the filling of the predetermined quantity of rinse solution (i.e. 1.8 gallons) into the holding tank 25 by opening the fresh water rinse supply valve 26 and "opening" the supply of NaOCl by actuating the air compressor 33 at the beginning of the wash cycle. The controller 50 also "closes" the supply of NaOCl after the predetermined quantity has been supplied to holding tank 25 by terminating operation of compressor 33. However, valve 26 is separately closed by the float control 38 which senses the quantity of solution in tank 25 and closes the valve when the predetermined quantity thereof has been supplied.

After the five second dwell period (FIG. 5), rinse pump 40 is energized by controller 50 for a period of 14 seconds. This is sufficient to pump substantially all of the rinse solution from holding tank 25 and to spray it onto the food ware items within the wash chamber 12 of the dishwashing machine 10.

The initial fill cycle, as described above, is also illustrated in FIG. 5 and is under control of controller 50. When the initial fill cycle is engaged, controller 50 bypasses float control 38 and holds the fresh rinse water valve 36 open for 171 seconds. Controller 50 then jumps to the rinse portion of a regular wash cycle, actuating rinse pump 40 for 14 seconds. The controller 50 then stops operation of machine 10, and resets to the beginning of a wash cycle, standing by to wash a load of dishes.

Although not illustrated, an electrical or other heater is provided below or within the sump 13. The heater is thermostatically controlled similarly to the shown in U.S. Pat. No. 3,911,943, issued to the assignee of this application. Use of the heater is necessitated, as a practical matter, by the fact that a large quantity of water is contained in the sump to provide the pump and washing efficiencies of the standard high-temperature machines. There are times when the machine may be idle from a few minutes up to several hours in a normal wash period. During such times, the large volume contents of the sump must be maintained ready and at the proper operating temperature designed to provide most efficient washing. Present-day detergents used for washing dishes drastically begin to lose effectiveness below water temperatures of 120° F. Thus, the thermostat is designed to control the heater to maintain the sump water at or above that temperature. Obviously, if detergents which can operate at lower temperatures are formulated, the thermostat can be adjusted accordingly and additional energy savings obtained.

What has been described herein as the preferred embodiment of the invention is the practical version of timing the filling of the holding tank 25 to start when the door of the wash chamber 12 is closed. With this embodiment, one is assured that the holding tank will not be filled and the water therein allowed to cool, should there by any time delay between two successive racks of dishes to be washed. For example, when a rack of washed dishes has also been completely rinsed, the wash chamber 12 will be opened and the rack of cleaned and rinsed sanitized dishes removed. The holding tank 25 remains empty during this time, the only water in the machine being that contained in the sump 13, which of course, is being maintained at the proper wash temperature. It twenty-five minutes elapses before the next rack of dishes is placed in the wash chamber, the holding tank remains empty for that entire period. Then, when the rack is placed in the machine and the chamber closed by lowering the door, not only is the washing cycle for that rack of dishes started, but the fill cycle for introducing fresh water and sanitizing agent into the holding tank commences. Since the wash cycle takes 43 seconds as shown in FIG. 5, obviously the introduction of water and sanitizing agent into the holding tank should take less than 43 seconds. The actual water fill time depends primarily on the flow rate of fresh water from the outlet 29. Ideally then, to conserve water and also to avoid having to reheat water that has been standing and cooling in the holding tank, it is ideal to fill the holding tank while the washing portion of a total cycle takes place.

However, it would also be possible (though less practical) for some or all of the time period for filling the holding tank to occur prior to commencement of the washing cycle. For example, the holding tank might be refilled as soon as the rinse pump 40 shuts off after draining the tank. If consecutive racks are being washed in rapid succession, little heat would be lost in the short time that the sanitizing rinse solution would stand in the holding tank. The main difficulty would be in those instances where the rinse solution stands for such a length of time that it cools below the washing temperature, particularly if no sump heater is provided to bring that rinse solution back up to washing temperature when it enters the sump. This obvious variation is believed to be within the scope of this invention.

As may be seen, therefore, the present invention provides numerous advantages. It makes possible a compact, single tank, low temperature machine which does not require the wash water to be dumped for each load. The rinse water is therefore never recirculated through the debris in the strainer, but is always fresh and clean. The invention is also applicable to multiple tank configurations, according to the particular needs and applications at hand. It is free from the prior art problems of uniform mixing and distribution, and always supplies the same quantity at the same mix ratio amd the same rinse pressure, regardless of line pressure or fluctuations therein. In the preferred form of the invention, the rinse solution is always fresh and above the minimum temperature, since preparation is inhibited until just before it is needed. The invention operates at high speed, is inexpensive, uncomplicated (using, for example, but a single water supply line and valve), compact, and reliable. Thus the present invention provides a properly proportioned, properly mixed, properly pressured, properly distributed, separately fed and sprayed, chemically sanitizing, low temperature fresh water rinse in which the sanitizing mixture is uniform from beginning to end.

While the method herein described, and the form of apparatus for carrying this method into effect, constitute preferred embodiments of this invention, it is to be understood that the invention is not limited to this precise method and form of apparatus, and that changes may be made in either without departing from the scope of the invention.

What is claimed is:

1. A sanitizing rinse system for use in a warewasher such as a dishwashing machine for supplying a predetermined quantity of rinse solution comprising fresh water and a chemical sanitizing agent uniformly distributed therein at a predetermined concentration, and for spraying the solution onto food ware items such as dishes within a chamber in the warewasher, the warewasher having a sump for retaining a quantity of wash water for spraying successive loads of food ware items during successive wash cycles, comprising:

(a) rinse nozzles for spraying the rinse solution onto the items within the chamber, the nozzles being connected and dedicated for spraying only the rinse solution, (b) a holding tank for accumulating a predetermined quantity of the rinse solution prior to spraying through said rinse nozzles, (c) a rinse pump connecting said holding tank to said rinse nozzles and controllable for pumping substantially all the rinse solution from the tank and onto the food ware items at a predetermined pressure and at a predetermined time during operation of the warewasher, (d) a source of fresh water at a temperature below effective bacteria killing temperatures and connected for introducing and circulating such fresh water into said holding tank, said source being openable and closeable for introducing fresh water when open and terminating the introduction thereof when closed, (e) a source of the chemical sanitizing agent connected and constructed for introducing a predetermined quantity thereof into said holding tank when actuated, (f) control means for controlling at least said fresh water and sanitizing agent sources for initiating filling of the predetermined quantity of rinse solution into said holding tank by opening said fresh water source and actuating said sanitizing agent source at predetermined times and closing said sanitizing agent source after a predetermined quantity of the agent has been supplied into said holding tank, (g) quantity sensing means for sensing the quantity of solution in said holding tank and closing said fresh water source when said holding tank contains the predetermined quantity of solution, and [(i)] *(h)* said control means also controlling said rinse pump during operation of the warewasher to pump and spray substantially all of the predetermined quantity of rinse solution from said holding tank onto the food ware items at a predetermined time during operation of the warewasher.

2. The system of claim 1 wherein said control means comprises means for opening said fresh water source and actuating said sanitizing agent source while the warewasher is in the process of washing items therein.

3. The system of claim 1 wherein said control means comprises means for opening said fresh water source and actuating said sanitizing agent source as substantially the same time.

4. The system of claim 1 wherein said fresh water source and said sanitizing agent source comprise means positioning them for introducing the fresh water and sanitizing agent into said holding tank at substantially the same place, above the highest level of fluid in the tank, and for entraining the sanitizing agent in the water to minimize the escape thereof into the surrounding atmosphere.

5. The system of claim 1 including actuatable fill cycle means for the warewasher, comprising:

(a) means mounting said holding tank above the height of the warewasher sump, (b) an overflow drain connecting said holding tank and the sump for draining fluid in excess of said predetermined holding tank quantity from said holding tank into the warewasher sump, and (c) means for overriding said quantity sensing means and holding said fresh water source open when said fill cycle means is actuated for overflowing a predetermined quantity of water from said holding tank into the sump, to provide for filling the warewasher from the same, single fresh water source which supplies the water for the rinse solution.

6. The system of claim 5 wherein said overriding means is part of said control means and overrides said quantity sensing means for a predetermined time interval.

7. The system of claim 6 wherein said fill cycle means further comprises means for operating said rinse pump to drain the contents of said holding tank and spray the same into the warewasher chamber after the predetermined time interval of said overriding means has expired.

8. The system of claim 1 wherein the warewasher chamber is a single chamber for holding, washing, and rinsing the food ware items.

9. The system of claim 1 further comprising freely rotating rinse arms connected to said rinse pump and supported and located at both the bottom and top of the warewasher chamber for spraying food ware items therein from both above and below, said rinse nozzles being located on said rinse arms, and said rinse means including means for rotating said arms in response to the pressure of the rinse solution supplied thereto by said rinse pump.

[10. In a sanitizing rinse system for a warewasher which includes a spray-type washing system for removing soil from articles to be washed prior to being rinsed, the improvement comprising:

a chamber in which articles to be rinsed are supported for washing and rinsing, a rinsing spraying system having spray nozzles within said chamber, a source of fresh water under facility line pressure associated with a main water supply, a holding tank for receiving a predetermined volume of water from said source, valve means for connecting and disconnecting said source with said tank for filling said tank, a sanitizing material supply, means for dispensing a predetermined quantity of sanitizing material into said tank for dispersion with water to produce a batch of sanitizing solution capable of destroying bacteria when sprayed onto said articles, pump means interconnecting said tank and spray nozzles to pump said batch of solution under pressure onto said articles to rinse said articles, first control means for operating said valve means to commence introduction of fresh water into said tank, second control means for operating said dispensing means to introduce said predetermined quantity of sanitizing material into said tank, and third control means independent of said first control means for operating said valve means to discontinue water introduction into said tank in response to achieving a predetermined batch of solution therein.]

11. A sanitizing rinse system for use in a warewasher such as a dishwashing machine for supplying a predetermined quantity of rinse solution comprising fresh water and a chemical sanitizing agent uniformly distributed therein at a predetermined concentration, and for spraying the solution onto food ware items such as dishes within the warewasher during a washing cycle, the warewasher having a single chamber for holding the food ware items during both the washing and rinsing thereof and a sump for retaining a quantity of wash water for spraying onto the food ware items during successive wash cycles, comprising:

(a) rinse nozzles for spraying the rinse solution onto the items within the chamber, the nozzles being connected and dedicated for spraying only the rinse solution, (b) a holding tank mounted above the height of the warewasher sump for accumulating a predetermined quantity of the rinse solution prior to spraying through said rinse nozzles, (c) a rinse pump connecting said holding tank to said rinse nozzles and controllable for pumping substantially all the rinse solution from the tank and onto the food ware items at a predetermined pressure and at a predetermined time during operation of the warewasher, (d) freely rotating rinse arms connected to said rinse pump and supported and located at both the bottom and top of the warewasher chamber for spraying food ware items therein from both above and below, said rinse nozzles being located on said rinse arms, and said rinse arms including means for rotating said arms in response to the pressure of the rinse solution supplied thereto by said rinse pump, (e) a source of fresh water at a temperature below the effective bacteria killing temperatures and connected for introducing and circulating such fresh water into said holding tank, said source being openable and closeable for introducing fresh water when open and terminating the introduction thereof when closed, (f) a source of the chemical sanitizing agent connected and constructed for introducing a predetermined quantity thereof into said holding tank when actuated, (g) means positioning said fresh water source and said sanitizing agent source for introducing the fresh water and sanitizing agent into said holding tank at substantially the same place, above the highest level of fluid in the tank, for mixing and for entraining the sanitizing agent in the water to minimize the escape thereof into the surrounding atmosphere, (h) control means for controlling at least said fresh water and sanitizing agent sources for initiating filling of the predetermined quantity of rinse solution into said holding tank by opening said fresh water source and simultaneously actuating said sanitizing agent source as the washing machine begins a washing cycle and closing said sanitizing agent source after a predetermined quantity of the agent has been supplied into said holding tank, (i) quantity sensing means for sensing the quantity of solution in said holding tank and closing said fresh water source when said holding tank contains the predetermined quantity of solution, (j) said control means also controlling said rinse pump during operation of the warewasher to pump and spray substantially all of the predetermined quantity of rinse solution from said holding tank into the food ware items at a predetermined time during operation of the warewasher, and (k) actuatable fill cycle means for the warewasher, including:

(i) an overflow drain connecting said holding tank and the sump for draining fluid in excess of said predetermined holding tank quantity from said holding tank into the warewasher sump, (ii) overriding means incorporated in said control means for overriding said quantity sensing means and holding said fresh water source open for a predetermined time interval when said fill cycle means is actuated for overflowing a predetermined quantity of water from said holding tank into the sump, to provide for filling the warewasher from the same, single fresh water source which supplies the water for the rinse solution, and (iii) means for operating said rinse pump to drain the contents of said holding tank and spray the same into the warewasher chamber after the predetermined time interval of said overriding means has expired.

12. A sanitizing rinse system for use in a warewasher such as a dishwashing machine for supplying a predetermined quantity of rinse solution comprising fresh water and a chemical sanitizing agent uniformly distributed therein at a predetermined concentration, and for spraying the solution onto food ware items such as dishes within a chamber in the warewasher, the warewasher having a sump for retaining a predetermined quantity of wash water and for collecting the wash and rinse solutions after spraying onto the food ware items for spraying successive loads of food ware items during successive wash cycles, the sump including a sump overflow drain for automatically controlling the level of wash water within the sump, and the rinse solution refreshing the wash water within the sump as the rinse solution is collected therein, comprising:

(a) rinse nozzles for spraying the rinse solution onto the items within the chamber, the nozzles being connected and dedicated for spraying only the rinse solution, (b) a holding tank for accumulating a predetermined quantity of the rinse solution prior to spraying through said rinse nozzles, (c) a rinse pump connecting said holding tank to said rinse nozzles and controllable for pumping substantially all the rinse solution from the tank and onto the food ware items at a predetermined pressure and at a predetermined time during operation of the warewasher, (d) a source of fresh water at a temperature below effective bacteria killing temperatures and connected for introducing and circulating such fresh water into said holding tank, said source being openable and closeable for introducing fresh water when open and terminating the introduction thereof when closed, (e) a source of the chemical sanitizing agent connected and constructed for introducing a predetermined quantity thereof into said holding tank when actuated, (f) control means for controlling at least said fresh water and sanitizing agent sources for initiating filling of the predetermined quantity of rinse solution into said holding tank by opening said fresh water source and actuating said sanitizing agent source at predetermined times and closing said sanitizing agent source after a predetermined quantity of the agent has been supplied into said holding tank, (g) quantity sensing means for sensing the quantity of solution in said holding tank and closing said fresh water source when said holding tank contains the predetermined quantity of solution, and (h) said control means also controlling said rinse pump during operation of the warewasher to pump and spray substantially all of the predetermined quantity of rinse solution from said holding tank onto the food ware items at a predetermined time during operation of the warewasher.

*13. In a sanitizing rinse system for a warewasher which includes a spray-type washing system for recirculating wash liquid over articles to be washed at a temperature below effective bacteria killing temperatures during each wash cycle of the washing system,*

*a chamber in which articles are supported for washing and rinsing,*

*a rinsing spraying system separate from said washing system and having rinse spray nozzles within said chamber dedicated to spraying only fresh rinse solution,*

*a source of fresh water under facility line pressure associated with a main water supply and at a temperature below effective bacteria killing temperature,*

*a holding tank for receiving water from said source,*

*valve means for connecting and disconnecting said source with said tank for filling said tank,*

*a sanitizing material supply,*

*means for dispensing a predetermined quantity of sanitizing material from said supply into said tank for dispersion with water to produce a batch for sanitizing solution capable of destroying bacteria when sprayed onto said articles,*

*pump means interconnecting said tank and said rinse spray nozzles to pump said batch of solution under a predetermined pressure onto said articles to rinse said articles;*

*the improvement comprising a cycle controller including:*

*timed means for opening said valve means to commence introduction of fresh water into said tank during each wash cycle,*

*timed means for operating said dispensing means to introduce a predetermined quantity of sanitizing material into said tank with each operation thereof for mixing with the fresh water,*

*means independent of said timed valve opening means and responsive to filling said tank with a predetermined fresh batch of solution for closing said valve means to discontinue water introduction into said tank, and*

*timed means for operating said pump means to discharge the fresh batch of sanitizing solution from said tank through said rinse spray nozzles after the completion of each wash cycle.*

* * * * *